(12) United States Patent
Tsuritani et al.

(10) Patent No.: US 10,789,818 B2
(45) Date of Patent: Sep. 29, 2020

(54) OPERATION PANEL STRUCTURE AND AUTOMATIC TELLER MACHINE INCLUDING OPERATION PANEL STRUCTURE

(71) Applicant: Oki Electric Industry Co., Ltd., Tokyo (JP)

(72) Inventors: Yoshiharu Tsuritani, Tokyo (JP); Masami Nagaoka, Tokyo (JP); Katsuhiro Sawanaka, Tokyo (JP)

(73) Assignee: OKI ELECTRIC INDUSTRY CO., LTD., Tokyo (JP)

( * ) Notice: Subject to any disclaimer, the term of this patent is extended or adjusted under 35 U.S.C. 154(b) by 0 days.

(21) Appl. No.: 16/479,534

(22) PCT Filed: Dec. 6, 2017

(86) PCT No.: PCT/JP2017/043865
§ 371 (c)(1),
(2) Date: Jul. 19, 2019

(87) PCT Pub. No.: WO2018/139064
PCT Pub. Date: Aug. 2, 2018

(65) Prior Publication Data
US 2019/0362606 A1 Nov. 28, 2019

(30) Foreign Application Priority Data

Jan. 30, 2017 (JP) .................................. 2017-013909

(51) Int. Cl.
*G07F 19/00* (2006.01)
*G06K 19/07* (2006.01)
*G07D 9/00* (2006.01)

(52) U.S. Cl.
CPC ....... *G07F 19/203* (2013.01); *G06K 19/0723* (2013.01); *G07D 9/00* (2013.01)

(58) Field of Classification Search
None
See application file for complete search history.

(56) References Cited

FOREIGN PATENT DOCUMENTS

| JP | H11154204 A | 6/1999 |
| JP | 2002269505 A | 9/2002 |
| JP | 2005284359 A | 10/2005 |
| JP | 2008305067 A | 12/2008 |
| JP | 2017199224 A | 11/2017 |

*Primary Examiner* — Kristy A Haupt
(74) *Attorney, Agent, or Firm* — Rabin & Berdo, P.C.

(57) ABSTRACT

An operation panel structure includes a panel member provided with an IC reader on which an IC medium may be placed. An upper surface portion of the panel member is provided with an elongated protrusion extending along, and in the vicinity of an edge among a front edge, a back edge, a left edge and a right edge of the IC reader, and a concave portion extending in an extending direction of the elongated protrusion, at a position of a side on which the IC medium may be placed with respect to the elongated protrusion.

9 Claims, 8 Drawing Sheets

OPERATION PANEL STRUCTURE AND AUTOMATIC TELLER MACHINE INCLUDING OPERATION PANEL STRUCTURE

TECHNICAL FIELD

The application claims priority from Japanese Patent Application No. 2017-13909, filed on Jan. 30, 2017, the disclosure of which is incorporated in its entirety by reference herein.

The present disclosure relates to an operation panel structure and an automatic teller machine including the operation panel structure.

BACKGROUND ART

Some automatic teller machines used in financial institutions or retail operations incorporate non-contact IC reader units. A non-contact IC reader unit transmits information to a non-contact IC medium and receives information from the non-contact IC medium by using radio waves. Herein, a "non-contact IC medium" includes, for example, not only a non-contact type IC card, but also an electronic device such as a smartphone that transmits and receives information between a built-in IC chip and an external device by using radio waves.

Operation panels of automatic teller machines that include a non-contact IC reader unit may have its non-contact IC reader on its exterior surface. The non-contact IC reader is what the non-contact IC medium may be placed on.

The operation panel is provided with, for example, a display input unit, a card inserting/returning port, a statement dispensing port, a banknote port (hereinafter "cash port"), a numeral input unit, etc., in addition to the non-contact IC reader. The display input unit incorporates a display and a touch panel. The card inserting/returning port is an opening for receiving and returning a cash card from and to the customer. The statement dispensing port is an opening for dispensing a transaction statement. The cash port is an opening for receiving and dispensing cash. The numeral input unit is a device for inputting numeric information such as a personal identification number and an amount of money.

The automatic teller machine can charge (deposit) electronic funds to the non-contact IC medium by accepting an input of cash, for example, as described below. For example, first, a customer presses a button for a charge transaction displayed on the display input unit. Next, the customer places the non-contact IC medium on the non-contact IC reader and inputs a charge amount by using the numeral input unit, in accordance with guidance information displayed on the display input unit. In response to the above operation by the customer, the automatic teller machine opens the cash port, so the customer can insert cash into the cash port. Then, the automatic teller machine charges (deposits) the electronic funds corresponding to the charge amount inputted through the numeral input unit to the non-contact IC medium. At this time, if the inserted amount inserted by the customer is larger than the charge amount inputted by using the numeral input unit, the automatic teller machine dispenses cash through the cash port for the difference in amount.

The automatic teller machine can also charge (deposit) the electronic funds to the non-contact IC medium by accessing an account of the customer managed by a host computer, for example, as described below. In this example, first, the customer presses the button for the charge transaction displayed on the display input unit. Next, the customer inserts the cash card into the card inserting/returning port, places the non-contact IC medium on the non-contact IC reader, and inputs a personal identification number and the charge amount by using the numeral input unit, in accordance with guidance information displayed on the display input unit. In response to the above operation by the customer, the automatic teller machine communicates information to the host computer. Then, the automatic teller machine accesses the customer's account managed by the host computer, withdraws (pays out) from the customer's account a deposit corresponding to the charge amount inputted by using the numeral input unit, and charges (deposits) the electronic funds corresponding to the charge amount withdrawn (paid out) from the account of the customer to the non-contact IC medium.

The operation panel structure of the automatic teller machine has a protrusion surrounding the non-contact IC reader, which prevents a non-contact IC medium placed on the non-contact IC reader from dropping off (see, for example, Japanese Patent Application No. 2016-090112).

SUMMARY OF THE INVENTION

Technical Problem

However, in the operation panel structure, it has been desired to improve the ease of removal of the non-contact IC medium, as described below.

The automatic teller machine needs to read non-contact IC media of various sizes from a relatively large and thick smartphone to a relatively small and thin IC card. For that reason, non-contact IC readers of operation panel structures of automatic teller machines are relatively wide. Such operation panel structures are configured to hold non-contact IC medium in close contact with the non-contact IC reader.

In such an operation panel structure, when a relatively small and thin IC card is placed on the non-contact IC reader, it is difficult for the user to pinch the IC card with his or her fingertips, and therefore it is difficult for a user to lift the IC card from the non-contact IC reader. Therefore, a need has been recognized for a means by which the non-contact IC medium can be easily removed from the operation panel structure.

The present disclosure has been made in view of the aforementioned problem, and presents an operation panel structure that facilitates an easier removal of the non-contact IC medium and the automatic teller machine including the operation panel structure.

Solution to Problem

According to a first aspect in the present disclosure, an operation panel structure includes a panel member provided with an IC reader on which an IC medium may be placed. An upper surface portion of the panel member includes an elongated protrusion extending along, in the vicinity of an edge among a front edge, a back edge, a left edge and a right edge of the IC reader, and a concave portion extending in an extending direction of the elongated protrusion, at a position of a side on which the IC medium may be placed with respect to the elongated protrusion.

Moreover, according to a second aspect in the present disclosure, an automatic teller machine includes an operation panel structure according to the first aspect and a transaction processing mechanism.

Advantageous Effects of Invention

According to the present disclosure, it is possible to improve the ease of removal of the IC medium.

DESCRIPTION OF EMBODIMENTS

Hereinafter, exemplary embodiments of an automatic teller machine of the present disclosure (hereinafter, referred to as "present exemplary embodiments") will be described in detail with reference to the drawings. It should be noted that the drawings are merely schematic illustrations to enable sufficient understanding of the present disclosure. Thus, the present disclosure is not limited to the illustrated examples. In each of the drawings, common configuration elements and similar configuration elements are marked with the same reference numerals, and duplicate explanations thereof are omitted.

First Exemplary Embodiment

General Configuration of Automatic Teller Machine

Figure 1:
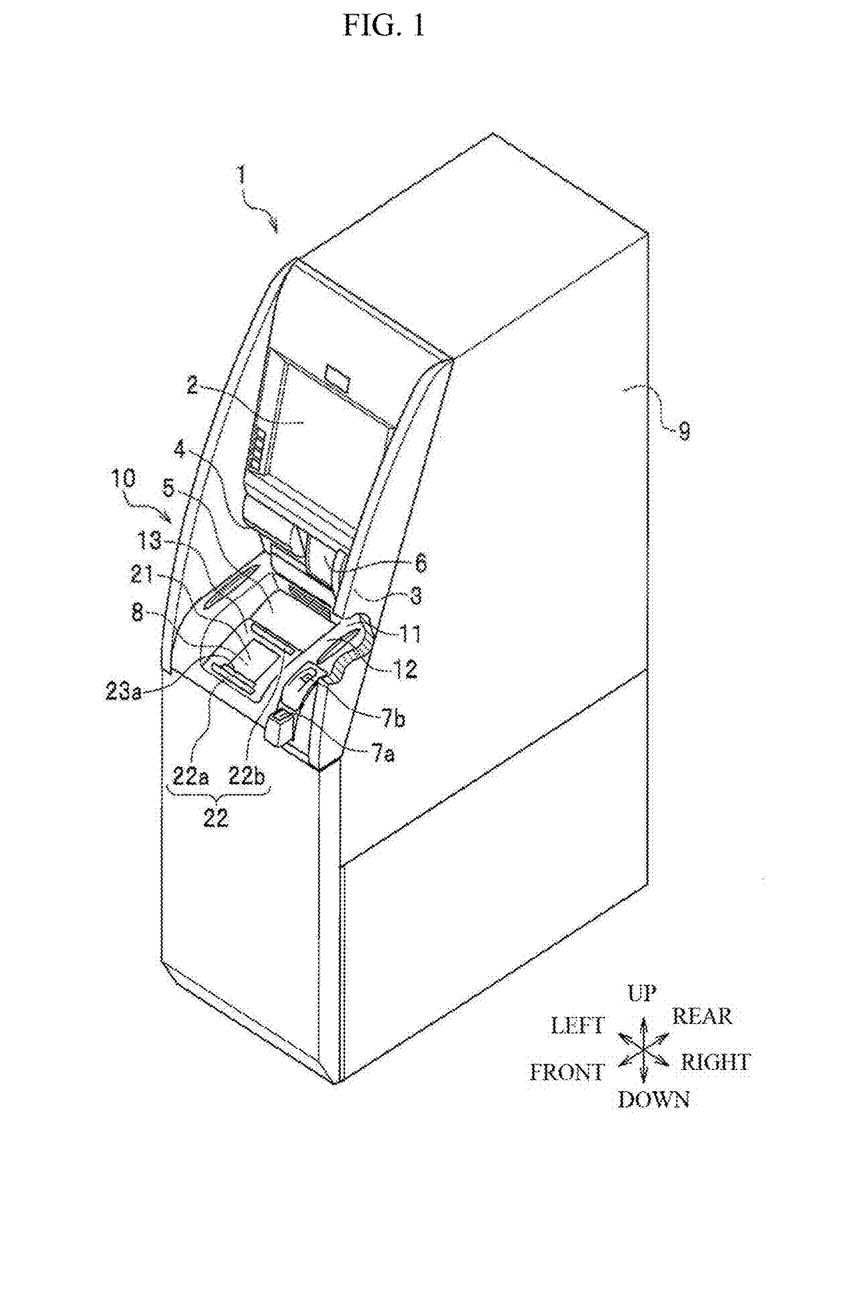
FIG. 1 is a view illustrating a general configuration of an automatic teller machine according to a first exemplary embodiment.

Hereinafter, referring to FIG. 1, the general configuration of an automatic teller machine 1 according to the first exemplary embodiment will be described. FIG. 1 is a view illustrating a general configuration of the automatic teller machine 1 according to the first exemplary embodiment. The automatic teller machine 1 is a machine that performs various transactions such as pay-in transactions and pay-out transactions.

As illustrated in FIG. 1, the automatic teller machine 1 according to the first exemplary embodiment includes a display input unit 2, a card inserting/returning port 3, a statement dispensing port 4, a banknote port (hereinafter "cash port") 5, a numeral input unit 6, a bar code reader 7a, a fingerprint authentication device 7b, a non-contact IC reader unit 8 (which may be a card reader unit and which may be referred as an "IC reader unit" for the sake of conciseness), and a transaction processing mechanism 9.

The display input unit 2 is a device in which a display and a touch panel are combined in a single display. The card inserting/returning port 3 is an opening for inserting and returning a cash card, a transfer card, or the like. The statement dispensing port 4 is an opening for dispensing a transaction statement. The cash port 5 is an opening for inserting and dispensing cash. The numeral input unit 6 is a device for inputting numeric information such as a personal identification number or an amount of money. The bar code reader 7a is a device for reading a bar code attached to a medium. The fingerprint authentication device 7b is a device for acquiring fingerprint information and authenticating an individual. The IC reader unit 8 is a unit that transmits information to a non-contact IC medium Cd (such as an IC card and also referred to for conciseness as an "IC medium") and receives information from the IC medium Cd by using radio waves (see, FIG. 4A and FIG. 4B). The transaction processing mechanism 9 is a mechanism for performing various transactions.

In the example illustrated in FIG. 1, the display input unit 2 is installed at a relatively high position of a surface of the automatic teller machine 1 that faces the customer. The card inserting/returning port 3, the statement dispensing port 4 and the numeral input unit 6 are disposed below the display input unit 2 respectively to the left, centered below and to the right. The cash port 5 is disposed at a position of the front side (frontward side) of the numeral input unit 6. A non-contact IC reader 21 (also referred to herein for the sake of conciseness as an "IC reader") is disposed at a position the further front side (frontward side) of the cash port 5. The IC reader 21 is a part on which the IC medium Cd (see, FIG. 4A and FIG. 4B) is placed. The information stored to the IC medium Cd is read by the IC reader unit 8 when the IC medium Cd is placed on the IC reader 21. The bar code reader 7a and the fingerprint authentication device 7b are disposed at positions to the right of the IC reader 21.

The IC reader unit 8 is disposed inside a position of a relatively front side (frontward side) of the automatic teller machine 1. The IC reader unit 8 is fixed inside the apparatus by a fixture (not illustrated). The IC reader 21 is provided on an exterior surface of the IC reader unit 8. The IC reader 21 has a size that permits the IC medium Cd to be placed on it (see FIG. 4A and FIG. 4B), and has a substantially flat surface shape.

Information indicating the position of the IC reader is provided for guidance by a nameplate, printing, modeling, etc. around the IC reader 21. The cash port 5 is disposed on the back side (rear side) of the IC reader 21.

The first exemplary embodiment envisages a case where the IC medium Cd is a non-contact type IC card (see FIG.

Figure 4A:
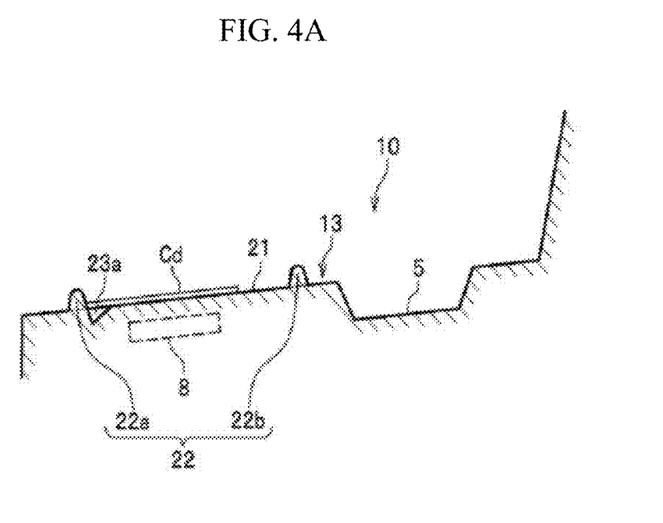
FIG. 4A is a view illustrating a method of removing a non-contact IC medium in the operation panel structure according to the first exemplary embodiment.
Figure 4B:
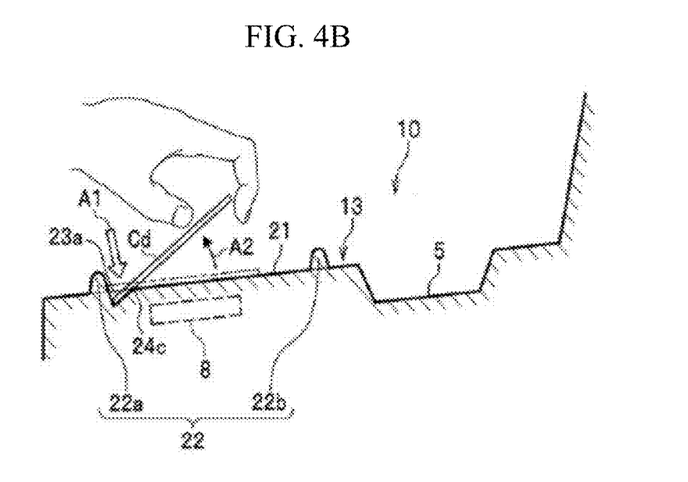
FIG. 4B is a view illustrating a method of removing the non-contact IC medium in the operation panel structure according to the first exemplary embodiment.

4A and FIG. 4B). However, the IC medium Cd (see, FIG. 4A and FIG. 4B) is not limited to the non-contact type IC card. The IC medium Cd may be an electronic device that transmits and receives information between a built-in IC chip and an external device by using radio waves (for example, smartphones or tablet type terminal devices, etc.).

The transaction processing mechanism 9 includes, for example, a controller, a communication unit, a feeding unit, a conveyance unit, a discrimination unit, a plurality of banknote cassettes, etc., which are not illustrated. These components are mainly provided inside the device. The controller controls the operation of each unit. The communication unit communicates with an external device such as a host computer, which is not illustrated. The feeding unit separates cash inserted into the cash port 5 one by one and feeds the separated cash to the conveyance unit. The conveyance unit conveys the cash to a desired place. The discrimination unit discriminates denomination, authenticity, etc. of the cash. Each banknote cassette stores cash by denomination.

General Configuration of the Operation Panel Structure

Figure 2A:
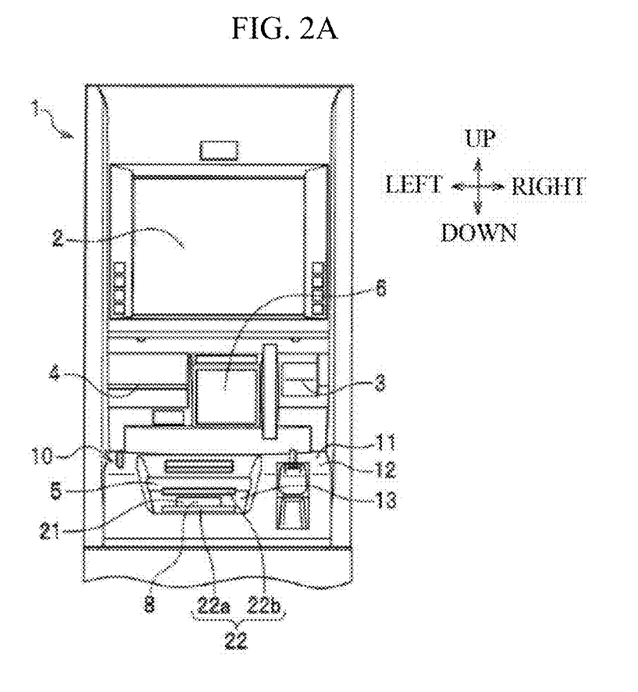
FIG. 2A is a front view illustrating a general configuration of an operation panel structure according to the first exemplary embodiment.
Figure 2B:
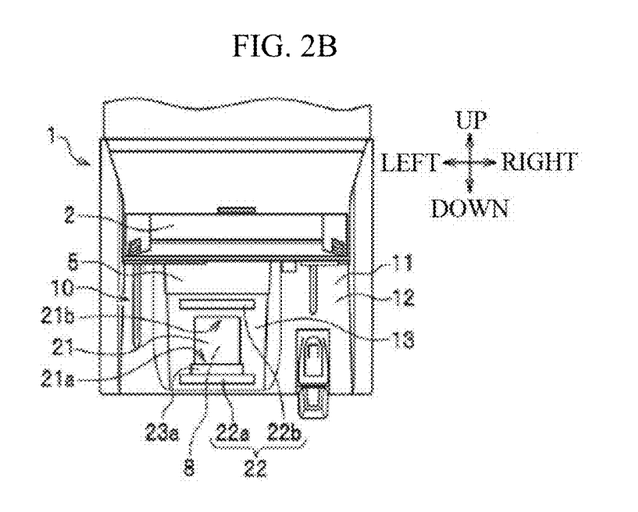
FIG. 2B is a top view illustrating a general configuration of the operation panel structure according to the first exemplary embodiment.

The automatic teller machine 1 includes an operation panel structure 10 as described below. Hereinafter, a general configuration of the operation panel structure 10 of the automatic teller machine 1 will be described with reference to FIG. 1, FIG. 2A and FIG. 2B. FIG. 2A and FIG. 2B illustrate a general configuration of the operation panel structure 10. FIG. 2A is a front view of the operation panel structure 10, and FIG. 2B is a top view of the operation panel structure 10.

As illustrated in FIG. 1, the operation panel structure 10 includes a panel member 11 provided with the IC reader 21. An upper surface portion 12 of the panel member 11 is inclined so as to be lowered from a relatively back side (rear side) to a front side (forward side) of the facing surface facing the customer using the automatic teller machine 1. The upper surface portion 12 of the panel member 11 is provided with the cash port 5, the bar code reader 7a, the fingerprint authentication device 7b, and the IC reader 21.

As illustrated in FIG. 1 and FIG. 2A, the substantially central portion 13 of the lateral direction in the upper surface portion 12 of the panel member 11 is recessed below other portions. The substantially center portion 13 is formed as an inclined surface portion inclined so as to be lowered from the back side (rear side) to the front side (forward side). Hereinafter, the substantially center portion 13 may be referred to as an "inclined surface portion 13". With such an operation panel structure 10, it is possible to prevent a beverage such as juice from being placed on the inclined surface portion 13. The IC reader 21 is provided on the inclined surface portion 13. Thus, with such the operation panel structure 10, it is possible to prevent a beverage such as juice from being placed on the IC reader 21.

As illustrated in FIG. 1 and FIG. 2B, in the upper surface portion 12 of the panel member 11, the inclined surface portion 13 includes one or more elongated protrusions 22 and one groove-shaped concave portion 23a. Herein, the term "elongated protrusion" means a protrusion that "extends" or "is elongated" in the plane of the upper surface portion 12.

The elongated protrusion 22 defines a position of the IC medium Cd (see FIG. 4A and FIG. 4B) placed on the IC reader 21 and is provided to hold the IC medium Cd so that the IC medium does not fall (see FIG. 4A and FIG. 4B).

The elongated protrusion 22 is formed along an extending direction of an edge of the IC reader 21 in a vicinity of at least one edge (a front edge, a back edge, a left edge, or a right edge) of the IC reader 21. In the first exemplary embodiment, two elongated protrusions 22a and 22b as the elongated protrusion 22 are formed in the vicinity of the front edge 21a and the back edge 21b of the IC reader 21 along the extending direction of the edge of the IC reader 21.

The front edge, the back edge, the left edge, and the right edge of the IC reader 21 are portions respectively corresponding to a lower end, an upper end, a left end, and a right end of the IC medium placed on the IC reader 21. Herein, the terms "lower end", "upper end", "left end", and "right end" of the IC medium mean each of ends respectively of a lower side, an upper side, a left side, a right side of the IC medium in the case where the customer views the IC medium placed on the IC reader 21.

In the illustrated example, the IC reader 21 has a rectangular shape. However, the IC reader 21 may have a shape other than rectangular. In general, since the IC medium has a rectangular shape, even if the IC reader 21 is formed in the another shape, each portion of the IC reader 21 corresponding to the lower end, the upper end, the left end, and the right end of the IC medium are for convenience explained as the front edge, the back edge, the left edge, and the right edge of the IC reader 21.

The concave portion 23a has a groove shape in the vicinity of the elongated protrusion 22a. When the IC medium Cd is placed on the IC reader 21, the concave portion 23a forms the space on the lower side of the IC medium Cd (see, FIG. 4A and FIG. 4B).

Detailed Configuration of the Operation Panel Structure

Figure 3A:
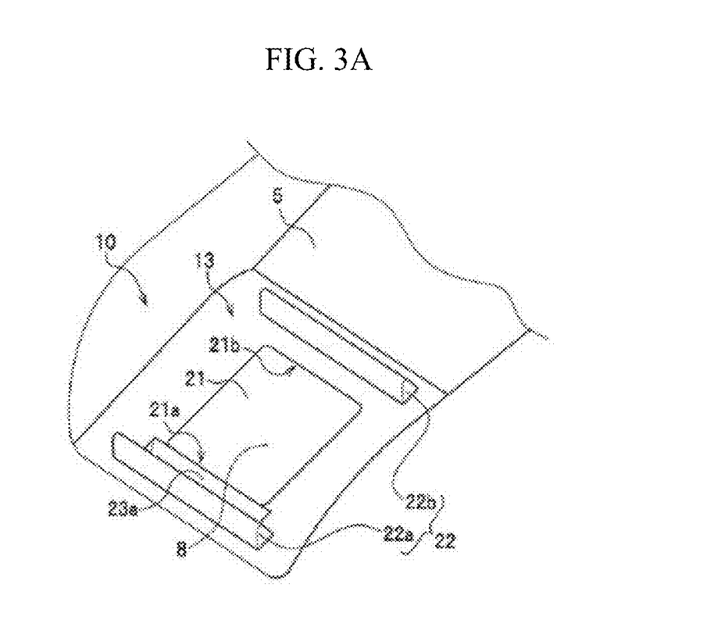
FIG. 3A is a perspective view illustrating details of the configuration of the operation panel structure according to the first exemplary embodiment.
Figure 3B:
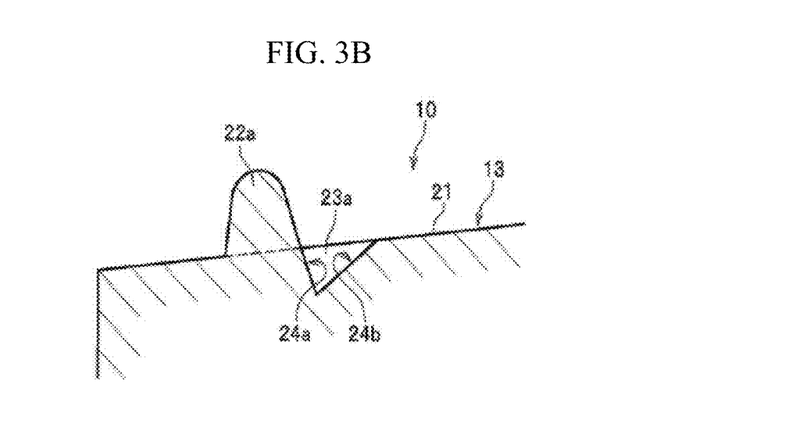
FIG. 3B is a side view illustrating details of the configuration of the operation panel structure according to the first exemplary embodiment.

Hereinafter, a detailed configuration of the operation panel structure 10 will be described with reference to FIG. 3A, FIG. 3B, FIG. 4A and FIG. 4B. FIG. 3A and FIG. 3B are views illustrating the detailed configuration of the operation panel structure 10. FIG. 3A is a perspective view illustrating a configuration of the operation panel structure 10, and FIG. 3B is a side view illustrating a configuration of the operation panel structure 10. FIG. 4A and FIG. 4B are views illustrating a method of removing the IC medium Cd from the operation panel structure 10. FIG. 4A is a view in a state where the IC medium Cd is placed on the IC reader 21, and FIG. 4B is a view illustrating the IC medium Cd while being removed from the IC reader 21.

As illustrated in FIG. 3A, the inclined surface portion 13 includes the above-described two elongated protrusions 22a and 22b and the above-described one concave portion 23a. The elongated protrusion 22a is formed along the front edge 21a of the IC reader 21. On the other hand, the elongated protrusion 22b is formed along the back edge 21b of the IC reader 21. The concave portion 23a is formed at a position of the side on which the IC medium Cd is placed with respect to the elongated protrusion 22a so as to extend in the extending direction of the elongated protrusion 22a.

As illustrated in FIG. 3B, the concave portion 23a includes a vertical wall surface 24a formed continuously with the wall surface of the elongated protrusion 22a and an inclined surface 24b formed so as to incline with respect to the vertical wall surface 24a. The concave portion 23a is a wedge-shape ("V"-shape) in a side view. As illustrated in FIG. 3B, the vertical wall surface 24a and the inclined surface 24b are each flat. However, the vertical wall surface 24a and the inclined surface 24b each may be arc-shaped.

Figure 9A:
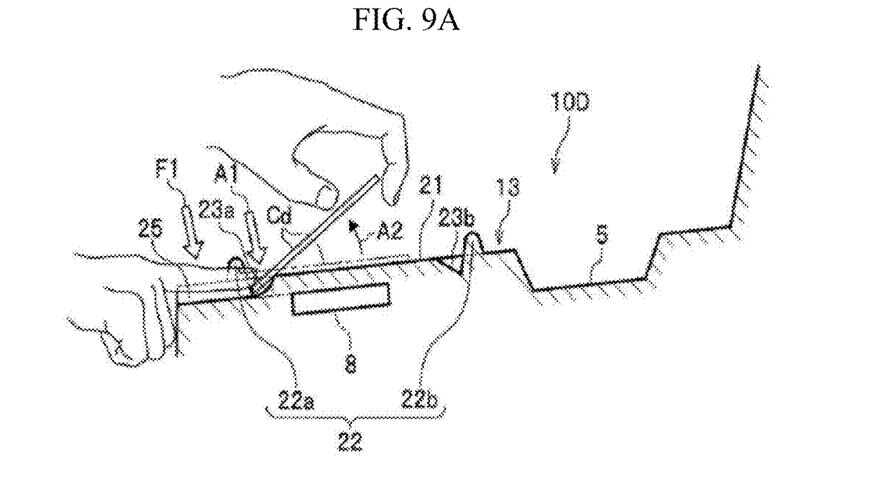
FIG. 9A is a view illustrating a method of removing a non-contact IC medium in the operation panel structure according to the fourth modification embodiment.
Figure 9B:
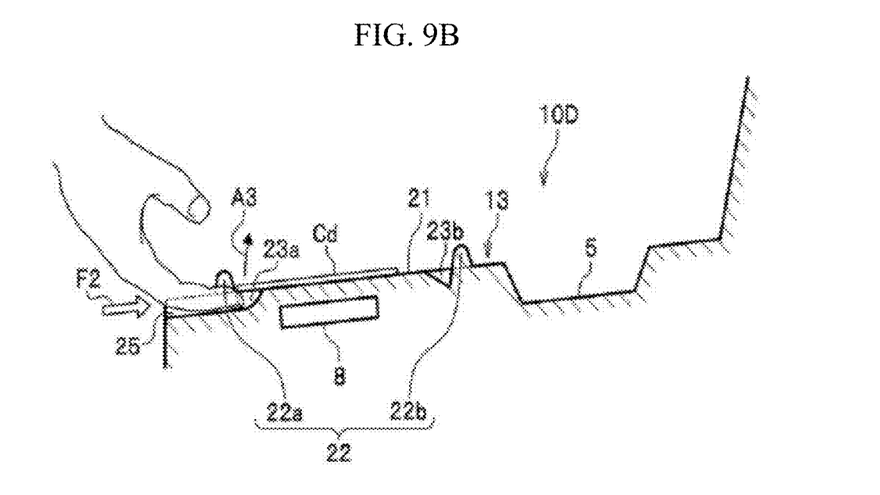
FIG. 9B is a view illustrating a method of removing the non-contact IC medium in the operation panel structure according to the fourth modification embodiment.

For example, the vertical wall surface 24a may have an arc-shape around a corner portion 24c (see FIG. 4B) to be described later. Moreover, the inclined surface 24b may be, for example, formed in an arc-shape, as illustrated in FIG. 9A and FIG. 9B.

As illustrated in FIG. 4A, the IC medium Cd is placed on the IC reader 21 formed on the inclined surface portion 13. In this case, gravity is applied to the IC medium Cd, and therefore the IC medium Cd slides down on the IC reader along the inclined surface portion 13 toward the front side (forward side) from the back side (rear side) of the device. As a result, the lower end of the IC medium Cd (an end on the left side in FIG. 4A) strikes the elongated protrusion 22a. Thereby, the elongated protrusion 22a holds the lower end of the IC medium Cd. Then, a space is formed by the concave portion 23a on a lower side of the lower end of the IC medium Cd.

As illustrated in FIG. 4B, in the case where the IC medium Cd is removed from the IC reader 21, the customer may push the lower end of the IC medium Cd from above the concave portion 23a in a direction of an arrow A1, thereby pushing the lower end of the IC medium Cd into the concave portion 23a. Then, the IC medium Cd rotates around the corner portion 24c of the concave portion 23a. As a result, the upper end of the IC medium Cd projects in the direction of an arrow A2 away from the upper surface of the IC reader 21. Thereby, the customer can easily pinch the upper end of the IC medium Cd with his or her fingertips. Therefore, the customer can easily pick up the IC medium Cd and remove it from the IC reader 21.

In such a configuration, a length of the concave portion 23a (specifically, a length of the elongated protrusion 22a in its extending direction, as illustrated in FIG. 3A) is preferably longer than a width of a portion of the IC medium Cd of the assumed maximum size facing the concave portion 23a so that the IC medium Cd of the assumed maximum size can be inserted into the concave portion 23a. Moreover, a width of the concave portion 23a is preferably equal or greater than the width at which the end portion (the lower end in the first exemplary embodiment) of a pressed side of the IC medium Cd can be entered into the concave portion 23a so that the end (the upper end in the first exemplary embodiment) of the side of the IC medium Cd projecting away from the upper surface of the IC reader 21 can be separated from the IC reader 21 to such an extent that the IC medium Cd can be pinched with the customer's fingertips. Considering the balance between the width of the concave portion 23a and a width of the elongated protrusion 22a, it is preferably that these widths be substantially the same.

Main Features of the Operation Panel Structure of the Automatic Teller Machine (1) The operation panel structure 10 according to the first exemplary embodiment includes the panel member 11 provided with the IC reader 21 on which the IC medium Cd is placed. The upper surface portion 12 of the panel member 11 includes one or more of elongated protrusions 22 (two elongated protrusions 22a and 22b in the first exemplary embodiment) and the concave portion 23a. The elongated protrusions 22 extend in parallel with and in the extending direction in the vicinity of at least one edge among the front edge, the back edge, the left edge, and the right edge of the IC reader 21. The concave portion 23a extends in the direction in which the elongated protrusion 22a extends, at a position of a side where the IC medium Cd is placed with respect to the elongated protrusion 22a.

In such an operation panel structure 10, a position at which the IC medium Cd is placed can be determined by the elongated protrusion 22a. In the operation panel structure 10, the customer presses one end portion (the lower end in the first exemplary embodiment) of the IC medium Cd from above the concave portion 23a, and therefore the other end portion (the upper end in the first exemplary embodiment) of the IC medium Cd can be tilted away from the upper surface of the IC reader 21. Thereby, the customer can easily pinch the other end portion of the IC medium Cd with his or her fingertips. Therefore, the customer can easily pick up the IC medium Cd and remove the IC medium from the IC reader 21. With such an operation panel structure 10, it is possible to ease the removal of the IC medium Cd.

(2) In the first exemplary embodiment, the length of the concave portion 23a is longer than a width of a portion of the IC medium Cd facing the concave portion 23a when the IC medium Cd is placed on the IC reader 21. Thereby, in use of the operation panel structure 10, when the customer presses one end portion of the IC medium Cd (the lower end in the first exemplary embodiment), the one end portion of the IC medium Cd will be received in the concave portion 23a.

(3) In the first exemplary embodiment, the concave portion 23 has a wedge-shape ("V"-shape) as seen from a side view. Thereby, in the operation panel structure 10, when the customer presses one end portion (lower end in the first exemplary embodiment) of the IC medium Cd, the IC medium Cd can be rotated around the corner portion 24c of the concave portion 23a. As a result, in the operation panel structure 10, other end portion of the IC medium Cd (the upper end in the first exemplary embodiment) can be floated from the upper surface of the IC reader 21.

(4) In the first exemplary embodiment, the inclined surface portion 13 is formed on the upper surface portion 12 of the panel member 11. Further, with the operation panel structure 10, since the IC reader 21 is installed on the inclined surface portion 13, it is possible to prevent a beverage such as juice from being placed on the inclined surface portion 13 (in particular, on the IC reader 21).

(5) In the first exemplary embodiment, the cash port 5 for depositing and withdrawing cash is formed on the upper surface portion 12 of the panel member 11. That is, an opening is formed on the upper surface portion 12 of the panel member 11. The elongated protrusion 22a is formed along an edge (front edge 21a) of the farthest side from the cash port 5. With such an operation panel structure 10, the IC medium Cd can be held by the elongated protrusion 22a so as not to fall from the IC reader 21.

(6) In the first exemplary embodiment, the elongated protrusion 22a and the concave portion 23a are formed along the front edge 21a as the edge of the farthest side from the cash port 5 among the front edge, the back edge, the left edge, and the right edge of the IC reader 21. With such an operation panel structure 10, when the customer places the IC medium Cd on the IC reader 21, the IC medium Cd is held by the elongated protrusion 22a of the farthest side from the cash port 5, and therefore the IC medium Cd can be held at a position separated from the cash port 5. Further, with the operation panel structure 10, when the customer removes the IC medium Cd from the IC reader 21, the IC medium Cd can be tilted upward away from the IC reader 21 by the concave portion 23a so that the upper end of the IC medium Cd is separated from the cash port 5. Thereby, the operation panel structure 10 makes it possible to easily remove the IC medium Cd while preventing the IC medium Cd from falling into the cash port 5.

MODIFICATION EXAMPLES

Such an operation panel structure 10 can be modified, for example, as operation panel structures 10A, 10B, 10C and 10D illustrated in FIG. 5 to FIG. 9A and FIG. 9B.

First Modification Example

Figure 5:
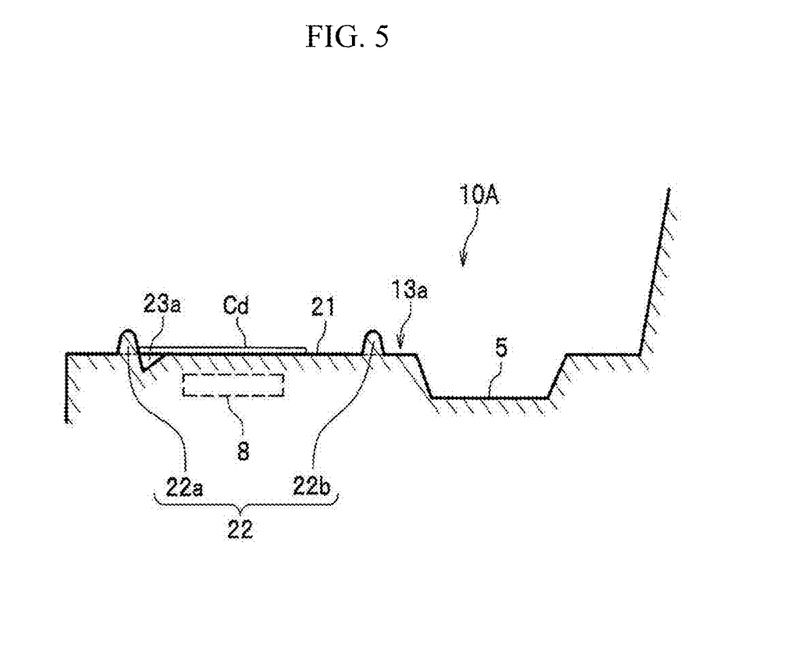
FIG. 5 is a view illustrating an operation panel structure according to a first modification example.

FIG. 5 is a view illustrating an operation panel structure 10A according to a first modification example. As illustrated in FIG. 5, the operation panel structure 10A according to the first modification example is different in that the IC reader 21 is provided on a horizontal surface portion 13a rather than the inclined surface portion 13 of the operation panel structure 10 (see, FIG. 4A) of the first exemplary embodiment. The horizontal surface portion 13a is flat and is disposed in a substantially horizontal plane. Thus, with the operation panel structure 10A according to the first modification example, the IC reader 21 may provide in a horizontal plane.

The IC reader 21 may be disposed on a position shifted to the right side or the left side with respect to a substantially central portion in the lateral direction in the upper surface portion 12 of the panel member 11 (for example, a position shifted to the right side or the left side from the inclined surface portion 13 illustrated in FIG. 2A and FIG. 2B).

Second Modification Example

Figure 6:
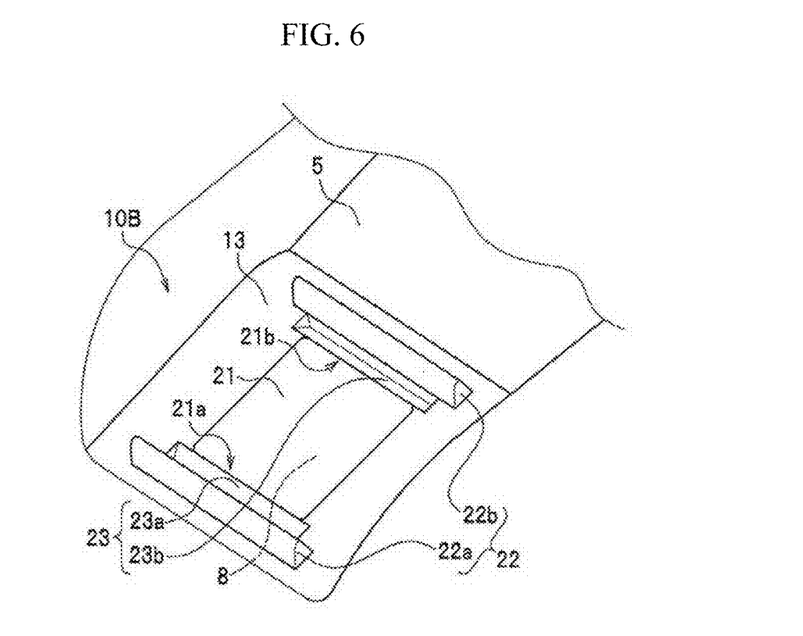
FIG. 6 is a view illustrating an operation panel structure according to a second modification example.

FIG. 6 is a view illustrating an operation panel structure 10B according to a second modification example. As illustrated in FIG. 6, the operation panel structure 10B according to the second modification example is different from the operation panel structure 10 (see, FIG. 3A) according to the first exemplary embodiment in that a concave portion 23b is provided in addition to the concave portion 23a. Hereinafter, if the concave portion 23a and the concave portion 23b are distinguished, the concave portion 23a may be referred to as a "first concave portion 23a", and the concave portion 23b may be referred to as a "second concave portion 23b". Moreover, the concave portion 23a and other concave portion (herein, the concave portion 23b) may collectively referred to as a "concave portion 23".

The second concave portion 23b is a groove located in the vicinity of the elongated protrusion 22b. The second concave portion 23b is formed along and extends in the direction that the elongated protrusion 22b extends, at the side where the IC medium Cd (see, FIG. 4A and FIG. 4B) is placed with respect to the elongated protrusion 22b.

With such an operation panel structure 10B, in the case where the upper surface portion of the IC medium Cd (see FIG. 4A and FIG. 4B) is disposed on the second concave portion 23b, the customer can easily pick up the IC medium Cd from the IC reader 21 by pressing the upper end of the IC medium Cd from above the second concave portion 23b as well as the first concave portion 23a, thereby removing the IC medium Cd away from the IC reader 21. With such an operation panel structure 10B, it is possible to increase the ease of removal of the IC medium Cd over that in the operation panel structure 10 according to the first exemplary embodiment (see FIG. 3A).

Third Modification Example

Figure 7:
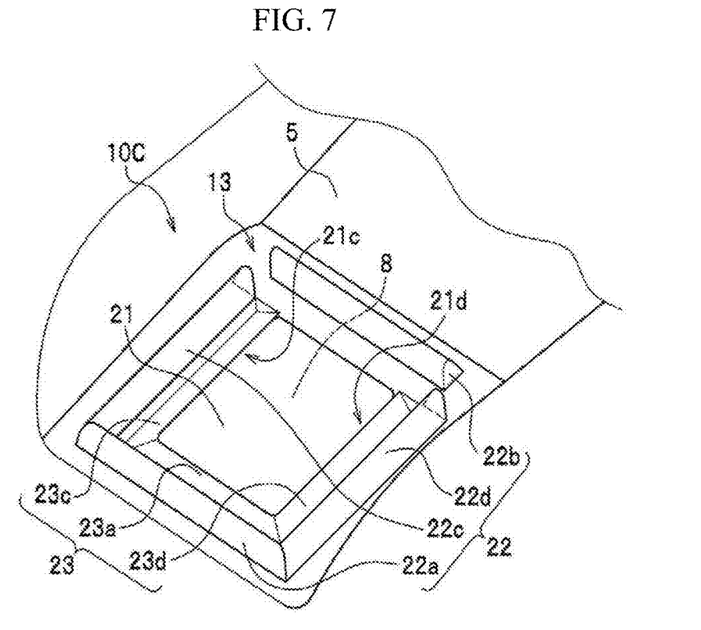
FIG. 7 is a view illustrating an operation panel structure according to a third modification example.

FIG. 7 is a view illustrating an operation panel structure 10C according to a third modification example. As illustrated in FIG. 7, the operation panel structure 10C according to the third modification example is different in that two elongated protrusions 22c and 22d are provided in addition to the elongated protrusions 22a and 22b of the operation panel structure 10 (see FIG. 3A) according to the first exemplary embodiment and two concave portions 23c and 23d are provided in addition to the concave portion 23a of the operation panel structure 10.

The elongated protrusions 22c and 22d are portions having an elongated shape respectively formed along the extending direction of a left edge 21c and a right edge 21d in the respective vicinities of the left edge 21c and the right edge 21d of the IC reader 21. In an example illustrated in FIG. 7, the elongated protrusions 22c and 22d have a structure integral with the elongated protrusion 22a (that is, a structure connected to the protrusion 22a). However, alternatively the elongated protrusions 22c and 22d may have a structure independent from the elongated protrusion 22a (that is, a structure separated from the protrusion 22a).

The concave portions 23c and 23d are groove-shaped portions respectively formed in the vicinities of the elongated protrusions 22c and 22d. The concave portions 23c and 23d form the space at the lower side of the left end and the right end of the IC medium Cd with respect to the IC medium Cd (see FIG. 4A and FIG. 4B) placed on the IC reader 21. Referring to FIG. 4A and FIG. 4B, the concave portions 23c and 23d are respectively formed so as to extend along the extending direction of the elongated protrusions 22c and 22d at a position of the side where the IC medium Cd is placed with respect to the elongated protrusions 22c and 22d.

In such an operation panel structure 10C, when the left end or the right end of the IC medium Cd (see FIG. 4A and FIG. 4B) are disposed on the concave portion 23c or the concave portion 23d, the customer can also remove the IC medium Cd from the IC reader 21 by pressing the left end or the right end of the IC medium Cd from above either the concave portion 23c or the concave portion 23d as well as from above the concave portion 23a. That is, the customer can pivot the IC medium Cd away from the IC reader 21. Thus, with the operation panel structure 10C, even if the IC medium Cd is placed on one of the concave portion 23a, the concave portion 23c and the concave portion 23d in a biased manner, the customer can float the IC medium away from the IC reader 21, thereby allowing easy removal of the IC medium. Therefore, in such the operation panel structure 10C, it is possible to increase the ease of removal of the IC medium Cd over that when the operation panel structure is the operation panel structure 10 according to the first exemplary embodiment illustrated in FIG. 3A.

Fourth Modification Example

Figure 8:
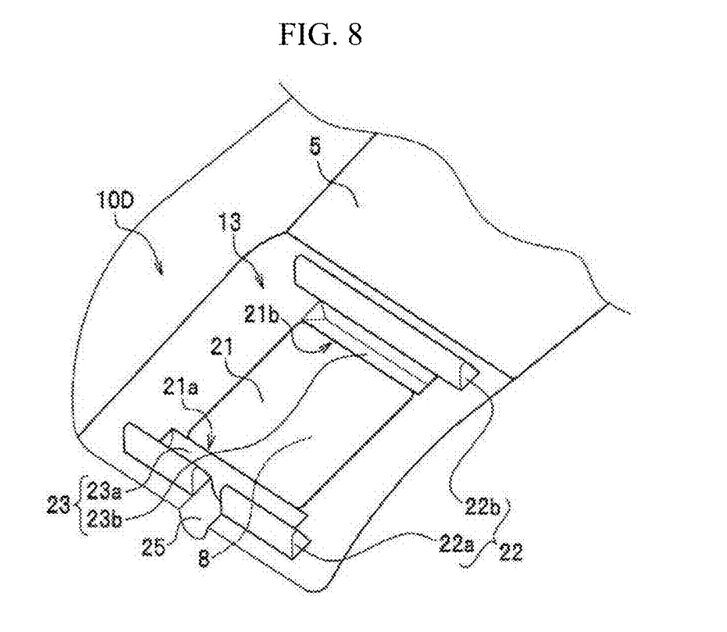
FIG. 8 is a view illustrating an operation panel structure according to a fourth modification example.

FIG. 8 is a view illustrating an operation panel structure 10D according to a fourth modification example. As illustrated in FIG. 8, the operation panel structure 10D according to the fourth modification example is different in that a concave portion 25 different from the concave portion 23 (the first concave portion 23a plus the second concave portion 23b) of the operation panel structure 10B (see FIG. 6) according to the second modification example.

The concave portion 25 is a portion having a groove shape extending in a cross direction so as to intersect the elongated protrusion 22a and the first concave portion 23a. The concave portion 25 is provided to facilitate the contact of the customer's fingertip with the lower end of the IC medium Cd (see FIG. 9A and FIG. 9B). Hereinafter, the concave portion 25 may be referred to as an "end concave portion 25".

FIG. 9A and FIG. 9B are views illustrating a method of removing the IC medium Cd from the operation panel structure 10D. FIG. 9A illustrates a removal method in the case of pushing down the lower end of the IC medium Cd, and FIG. 9B illustrates a removal method in the case of lifting the lower end of the IC medium Cd. In the example illustrated in FIG. 9A and FIG. 9B, a tip of end concave portion 25 is formed in an arc-shaped groove so that the customer can easily insert a fingertip into the end concave portion 25. Moreover, in accordance with a shape of the tip of the end concave portion 25, the inclined surface 24b (see FIG. 3B) of the first concave portion 23a is formed in the shape of an arc-shaped groove.

As illustrated in FIG. 9A, the customer inserts a fingertip from above the end concave portion 25 into the end concave portion 25 in the direction of arrow F1. Thereby, the customer can bring the fingertip into contact with the lower end of the IC medium Cd from above the first concave portion 23a. As a result, the customer can press the lower end of the IC medium Cd in the direction of the arrow A1 from above the first concave portion 23a, and thereby push the lower end of the IC medium Cd into the first concave portion 23a. Thereby, the customer can lift the upper end of the IC medium Cd away from the IC reader 21 in the direction of the arrow A2, to allow the upper end of the IC medium Cd to be easily pinched with his or her fingertips. Thus, the customer can easily remove the IC medium Cd from the IC reader 21.

As illustrated in FIG. 9B, the customer inserts a fingertip from the front side of the end concave portion 25 in the direction of the arrow F2, into the end concave portion 25. Thereby, the customer can insert the fingertip toward a lower side of the lower end of the IC medium Cd, and bring the fingertip into contact with the lower end of the IC medium Cd. As a result, the customer can hook the fingertip on the lower end of the IC medium Cd and can lift the lower end of the IC medium Cd in the direction of arrow A3. As a result, the customer can lift the lower end of the IC medium Cd from the IC reader 21, thereby making it easy to pinch the fingertip the lower end of the IC medium Cd. The customer can also lift the IC medium Cd from the IC reader 21 by pressing the upper end of the IC medium Cd from above the second concave portion 23b, making it easy to remove the IC medium Cd. Thus, the customer can easily remove the IC medium Cd from the IC reader 21.

With such an operation panel structure 10D, the customer can bring the fingertip into contact with the IC medium Cd by inserting the fingertip into the end concave portion 25. Therefore, with the operation panel structure 10D, it is possible to improve the ease of removing the IC medium Cd more than the operation pane structure 10B (see FIG. 6) of the second exemplary embodiment.

In such a configuration, the length of the end concave portion 25 is preferably longer than or equal to the length at which the finger of standard size (in particular, the index finger) can be inserted. Moreover, the width of the end concave portion 25 is preferably longer than or equal to the width at which the finger of the standard size (in particular, the index finger) can be inserted.

As described above, with the operation panel structure 10 according to the first exemplary embodiment, it is possible to improve the ease of removing the IC medium Cd. Similarly, with operation panel structures 10A, 10B, 10C and 10D according to the first modification example to fourth modification example, it is possible to improve the ease of removing the IC medium Cd.

Second Exemplary Embodiment

The operation panel structure 10 (see, FIG. 3A and FIG. 3B) according to the first exemplary embodiment is configured to be float the IC medium Cd using the concave portion 23a. On the other hand, the second exemplary embodiment provides an operation panel structure 10E configured to be floated the IC medium Cd using a protrusion 26 (see, FIG. 10A and FIG. 10B) different from the elongated protrusion 22.

Figure 10A:
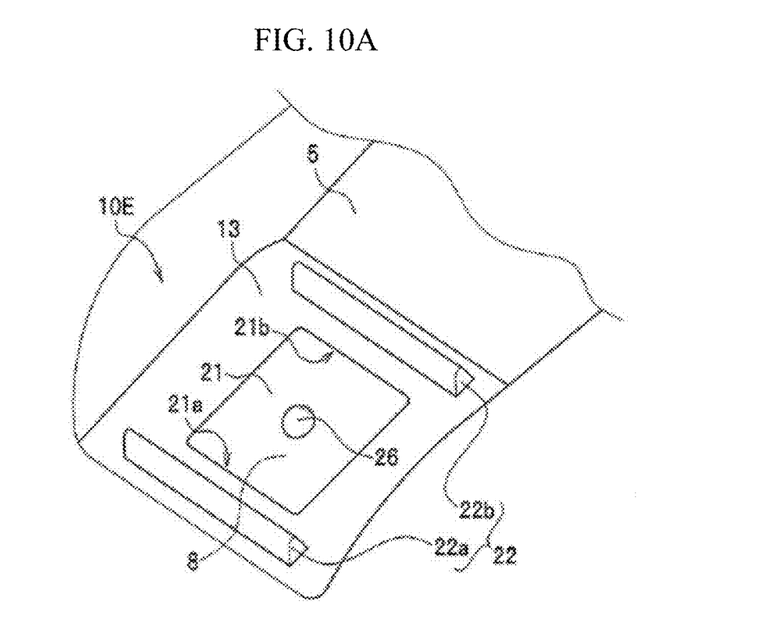
FIG. 10A is a view illustrating an operation panel structure according to a second exemplary embodiment.
Figure 10B:
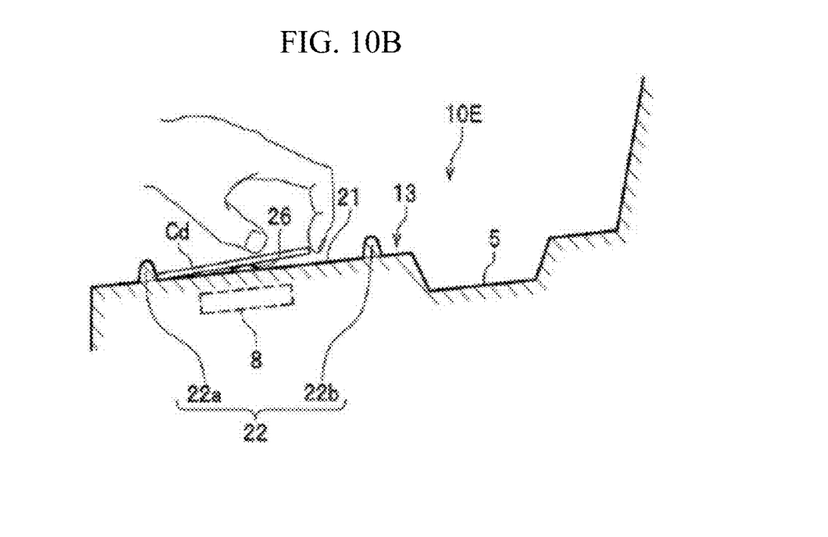
FIG. 10B is a view illustrating an operation panel structure according to the second exemplary embodiment.

Hereinafter, the configuration of the operation panel structure 10E according to the second exemplary embodiment will be described with reference to FIG. 10A and FIG. 10B. FIG. 10A and FIG. 10B are views illustrating the configuration of the operation panel structure 10E according to the second exemplary embodiment. FIG. 10A illustrates a perspective view of the operation panel structure 10E, and FIG. 10B illustrates a side view of the operation panel structure 10E.

As illustrated in FIG. 10A, the operation panel structure 10E according to the second exemplary embodiment is different in that the concave portion 23a is not provided on the upper surface portion of the panel member and the protrusion 26 difference from the elongated protrusion 22 is provided on the upper surface portion of the panel member, as compared with the operation panel structure 10 (see, FIG. 3A and FIG. 3B) according to the first exemplary embodiment.

The protrusion 26 is provided on the IC reader 21. The protrusion 26 is provided to support the IC medium Cd placed on the IC reader 21 from below.

As illustrated in FIG. 10B, with the operation panel structure 10E, when the IC medium Cd is placed on the IC reader 21, the elongated protrusion 22a supports the lower end of the IC medium Cd. Then, the protrusion 26 supports a substantially central portion of the IC medium Cd from below. Thereby, the substantially central portion of the IC medium Cd is spaced from the IC reader 21. As a result, the upper end of the IC medium Cd can be easily removed from the IC reader 21. Hereinafter, the protrusion 26 may be referred to as a "spacing supporting protrusion 26".

In such the operation panel structure 10E, the IC medium Cd can be floated from the IC reader 21 by using the spacing supporting protrusion 26. Thereby, the customer can easily pinch the upper end of the IC medium Cd with fingertips. Consequently, the customer can pick up the IC medium Cd and easily remove it from the IC reader 21. In such the operation panel structure 10E, it is possible to improve the ease of removal of the IC medium Cd as with the operation panel structure 10 according to the first exemplary embodiment (see FIG. 3A).

As described above, in the operation panel structure 10D according to the second exemplary embodiment, it is possible to improve the ease of removal of the IC medium Cd as with the operation panel structure 10 according to the first exemplary embodiment.

The present disclosure is not limited to the above exemplary embodiments, and various modification and changes may be implemented within a range not departing from the spirit of the present disclosure. For example, the above exemplary embodiments have been explained in detail in order to facilitate understanding of the spirit of the present disclosure. Thus, the present disclosure is not limited to including all the configuration elements explained above.

Moreover, other elements may be added to or exchanged with the elements of the exemplary embodiments of the present disclosure. In the present disclosure, certain characteristics of the elements may also be omitted from the exemplary embodiments.

For example, in the above exemplary embodiments, the IC reader 21 is installed on the inclined surface portion 13. However, the IC reader 21 may be installed at a position which is not inclined.

The invention claimed is:

1. An operation panel structure, comprising:
   a panel member provided with an Integrated Circuit (IC) reader on which an IC medium may be placed, wherein the panel member includes, at an upper surface portion thereof,
      an elongated protrusion extending along, and in the vicinity of an edge among a front edge, a back edge, a left edge and a right edge of the IC reader; and
      a concave portion extending in a same direction as that of the elongated protrusion, at a position of a side on which the IC medium is placeable, the concave portion being recessed with respect to the upper surface portion.

2. The operation panel structure according to claim 1, wherein a length of the concave portion is longer than a width of the portion of the IC medium placed on the IC reader.

3. The operation panel structure according to claim 1, wherein in a side view, the concave portion has a "V"-shape.

4. The operation panel structure according to claim 1, wherein
   the upper surface portion of the panel member has an inclined surface portion, and
   the IC reader is installed on the inclined surface portion.

5. The operation panel structure according to claim 1, further comprising
   a cash port through which to deposit or withdraw cash, formed in the upper surface portion of the panel member, wherein
   the edge on which the elongated protrusion is formed is the edge of the IC reader farthest from the cash port.

6. An automatic teller machine according to claim 1, comprising:
   the operation panel structure of claim 1; and
   a transaction processing mechanism.

7. The operation panel structure according to claim 1, wherein when the IC medium is placed on the IC reader while one edge of the IC medium is aligned with the elongated protrusion, the concave portion forms a space to accommodate the one edge of the IC medium, and wherein the concave portion is formed such that the IC medium tilts away from the upper surface portion when the one edge of the IC medium enters into the concave portion.

8. An operation panel structure, comprising:
   a panel member provided with an Integrated Circuit (IC) reader on which an IC medium may be placed, the panel member including an upper surface portion, and
   a cash port through which to deposit or withdraw cash, formed in the upper surface portion of the panel member, wherein
   the upper surface portion of the panel member includes
      an elongated protrusion extending along, and in the vicinity of an edge among a front edge, a back edge, a left edge and a right edge of the IC reader; and
      a concave portion extending in an extending direction of the elongated protrusion, at a position of a side on which the IC medium may be placed with respect to the elongated protrusion,
   the edge of the IC reader is a first edge among the edges of the IC reader, the first edge being a far side edge farthest among the edges of the IC reader from the cash port, further comprising a second edge among the edges of the IC reader, the second edge being a near side edge nearest among the edges of the IC reader to the cash port,
   the elongated protrusion is a first elongated protrusion extending along, and in the vicinity of the first edge, the upper surface portion of the panel member further comprising a second elongated protrusion extending along, and in the vicinity of the second edge, and
   the concave portion is a first concave portion extending along, and in the vicinity of the first elongated protrusion, the upper surface portion of the panel member further comprising a second concave portion extending along, and in the vicinity of the second elongated protrusion.

9. An operation panel structure, comprising:
   a panel member provided with an Integrated Circuit (IC) reader on which an IC medium may be placed, wherein
   an upper surface portion of the panel member includes
      an elongated protrusion extending along, and in the vicinity of an edge among a front edge, a back edge, a left edge and a right edge of the IC reader; and
      a concave portion extending in an extending direction of the elongated protrusion, at a position of a side on which the IC medium may be placed with respect to the elongated protrusion, and
   the upper surface portion of the panel member further includes another concave portion formed to extend in a cross direction intersecting both the elongated protrusion and the concave portion.

* * * * *